United States Patent [19]
Chronister

[11] 3,799,188
[45] Mar. 26, 1974

[54] VALVE
[75] Inventor: Clyde H. Chronister, Houston, Tex.
[73] Assignee: Chronister Development, Inc., Houston, Tex.
[22] Filed: Jan. 26, 1973
[21] Appl. No.: 326,779

[52] U.S. Cl............. 137/271, 137/269.5, 137/315, 137/329.1, 251/228, 251/301, 251/343
[51] Int. Cl............................................. F16k 43/00
[58] Field of Search ........ 137/315, 328, 327, 329.1, 137/329.3, 454.6, 269, 271; 251/316, 304, 343, 344, 345, 357, 326, 301, 560, 352, 228

[56] References Cited
UNITED STATES PATENTS
| | | | |
|---|---|---|---|
| 2,883,147 | 4/1959 | Mirza et al...................... | 251/301 X |
| 3,123,334 | 3/1964 | Hitz................................ | 251/300 X |
| 3,557,822 | 1/1971 | Chronister........................ | 137/315 |

Primary Examiner—Alan Cohan
Assistant Examiner—Robert J. Miller
Attorney, Agent, or Firm—Jefferson D. Giller; James F. Weiler; William A. Stout

[57] ABSTRACT

A valve having first and second conduits extending into a housing and spaced from each other to provide an opening therebetween with a sleeve telescoping with the conduits so as to close the opening to provide a through conduit valve, and to retract to allow a rotative flow control device for controlling the flow through the conduits to be moved into and out of the opening. The flow control means may include a spherical portion carrying a tubular member with the tubular member sized for engagement with the sleeve. The flow control means may include one or more flow control elements, such as a closure, check valve, orifice valve and/or regulating valve, which may be selectively rotated into the opening.

17 Claims, 10 Drawing Figures

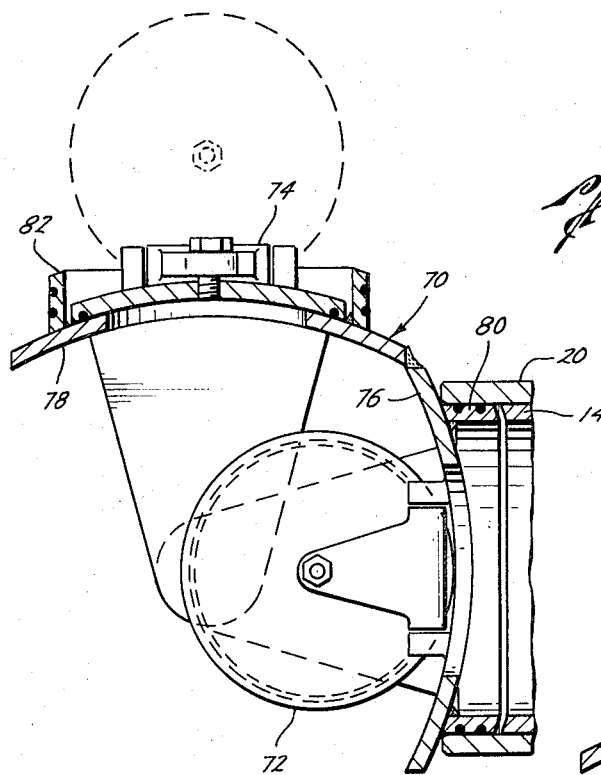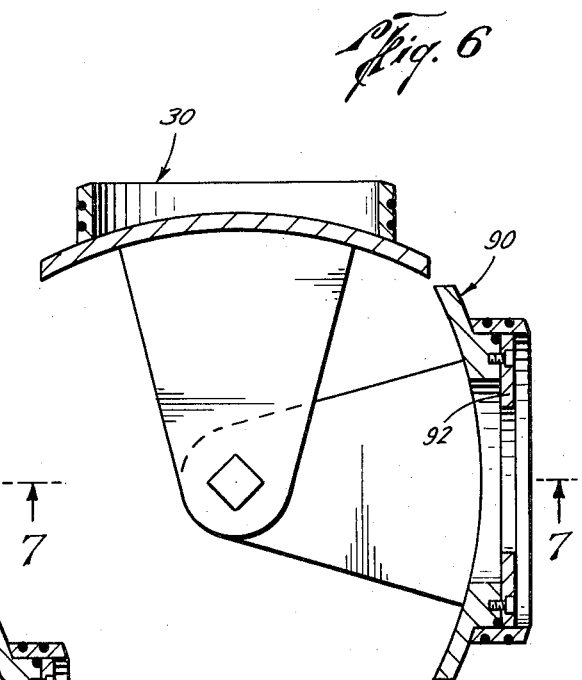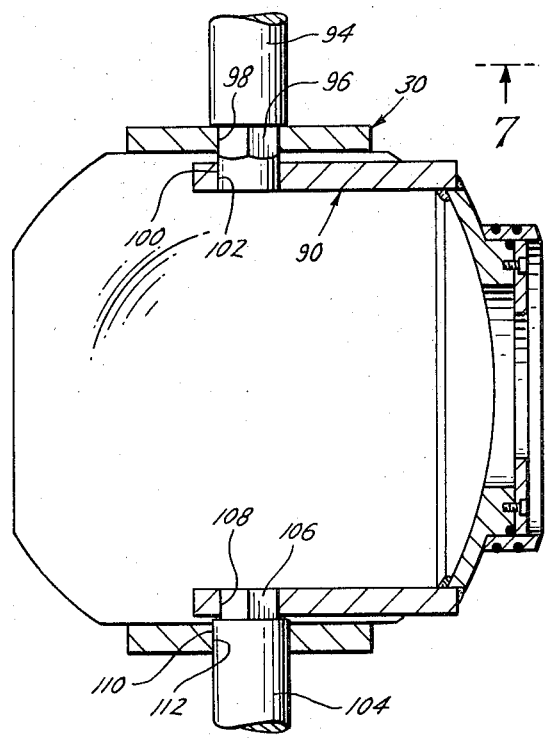

3,799,188

VALVE

BACKGROUND OF THE INVENTION

Ball-type valves or gate valves per se are known for controlling the flow through the inlet and outlet of a valve. The present invention is directed to an improved valve which includes a telescoping sleeve for closing the opening between the ends of an inlet and outlet conduit to provide a through conduit valve such as shown in my prior U.S. Pat. No. 3,665,953, but which includes flow control means which may be rotated into and out of the opening for controlling the flow through the valve. The present inventions provide a quicker opening than the gate valve and eliminate the disadvantages of a ball-type valve of high torque and excessive wear on the sealing seats.

SUMMARY

The present invention is directed to a valve having first and second conduits extending into a valve housing and spaced from each other forming an opening therebetween, a telescopically sliding sleeve positioned on one of the conduits for closing the space between the conduit ends, and flow control means pivotally supported, preferably about an axis that is perpendicular to the axis of the conduit, for movement into and out of the space for controlling the fluid flow therethrough. Preferably, the flow control means includes a sector of a hollow ball which requires only a minimum movement for rotation into and out of the opening, by virtue of which the valve is quick opening, and allows the width of the opening and the width of the valve to be kept to a minimum. In addition, an inexpensive valve is provided which has positive sealing, requires a low torque for actuation, and reaches the wear on the valve seat seals.

The present invention is also directed to the provision of a tubular member on the flow control means which is sized for engagement with the sleeve when the flow control means is rotated into the opening. Preferably, the tubular member has the same cross-section as the conduit so as to telescopically engage with the sleeve. In addition, it is preferred that the seal means between the sleeve and the tubular member, when they are so engaged, be positioned on the tubular member whereby the seal means may be repaired and replaced through an access opening in the housing while the valve is in service.

The present invention further provides a flow control means which includes more than one flow control element, any one of which may be rotated into and out of the opening for selectively controlling the flow through the valve. In addition, it is desired to provide a multiple-flow control device which may be rotated into and out of the opening by separate control means or connected together and rotated in unison.

The present invention may further include multiple-flow control elements rotatable into and out of the opening in which the elements may be a closure member, a check valve, an orifice valve, a throttling or regulating valve, or other type of flow control device.

BRIEF DESCRIPTION OF THE DRAWINGS

FIG. 1A is an elevational view, in cross-section, of the second half-section of the valve of FIG. 1 shown with the sleeve retracted, FIG. 2A is a cross-sectional view of the second half-section of the valve shown in FIG. 2, but with the sleeve longitudinally moved into engagement with the flow control means and closing the valve, FIG. 5 is a fragmentary elevational view, partly in cross-section, illustrating a modified flow control element of the present invention utilizing two check valves in the flow control means, FIG. 6 is a fragmentary elevational view, in cross-section, illustrating a flow control means having two separate flow control devices which are separately rotatable, FIG. 7 is a cross-sectional view taken along the line 7—7 of FIG. 6.

DESCRIPTION OF THE PREFERRED EMBODIMENTS

Figure 1:
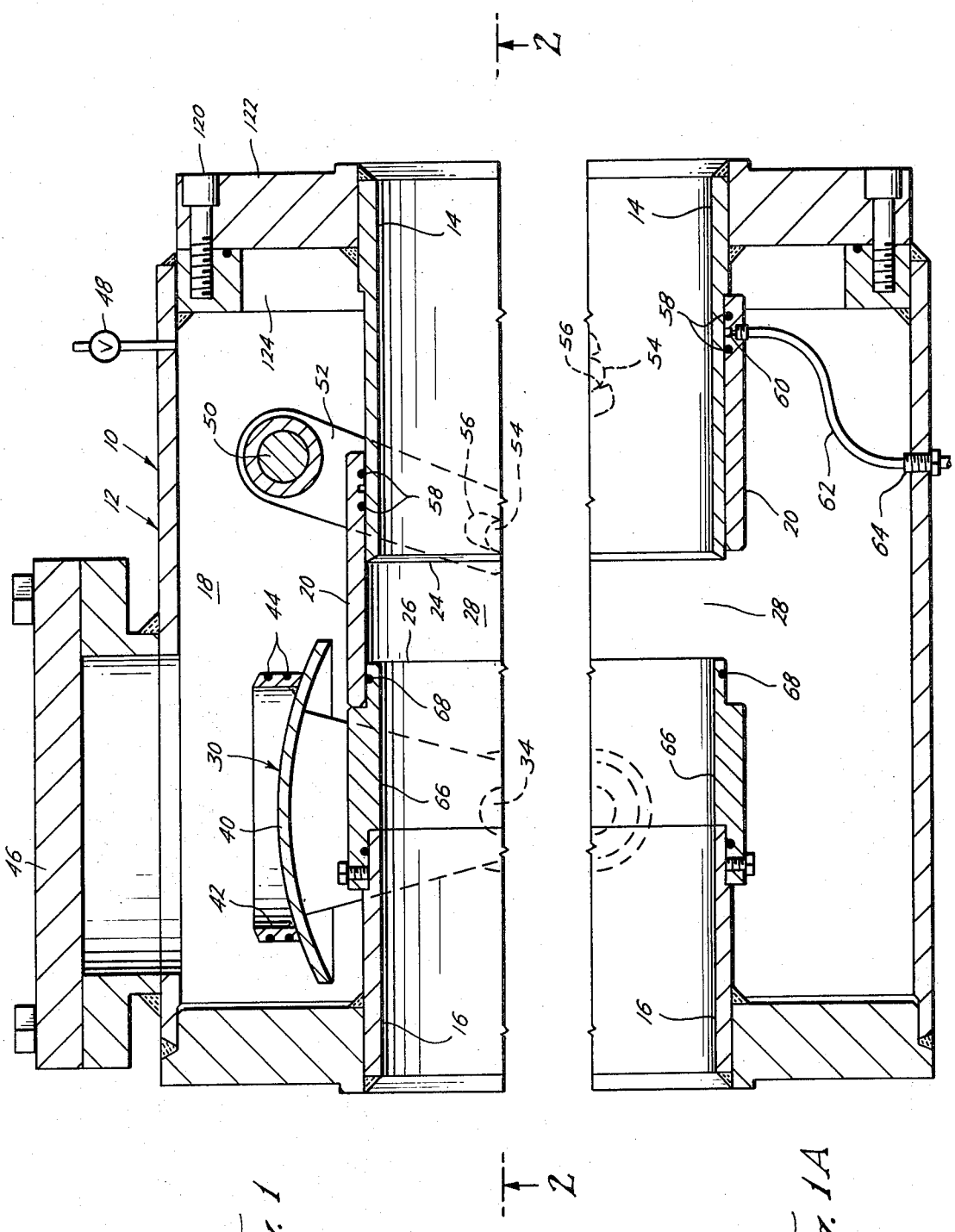
FIG. 1 is an elevational view in cross-section, shown in half-section, of one embodiment of the valve of the present invention shown in the open position.

Referring now to the drawings, and particularly to FIG. 1, the reference numeral 10 generally indicates the through conduit valve of the present invention and generally includes a housing 12, a first conduit 14 and a second conduit 16. Either of the conduits 14 or 16 may be the inlet and the other the outlet; however, it is preferable that conduit 14 be the inlet as it coacts directly with the valve seat, as will be more fully described, to positively close off conduit 14 even if the housing 12 would leak.

The conduits 14 and 16 are axially aligned, but their respective ends 24 and 26 are longitudinally spaced from each other to provide an opening 28 between the ends 24 and 26.

A sliding sleeve 20 is provided which is coaxially positioned relative to the conduit 14 and 16 and movable longitudinally to slidably telescope with the ends 24 and 26 in a sealing relationship. When the sleeve 20 is longitudinally moved to engage both ends 24 and 26 and cover the opening 28, as best seen in FIG. 1, flow is permitted through the conduits 14 and 16 providing a through conduit valve but flow through the conduits 14 and 16 is prevented from entering the housing cavity 18. When the sleeve is telescopically retracted on end 24 of conduit 14, as best seen in FIG. 1A, the opening 28 is opened to the housing cavity 18.

Figure 2:
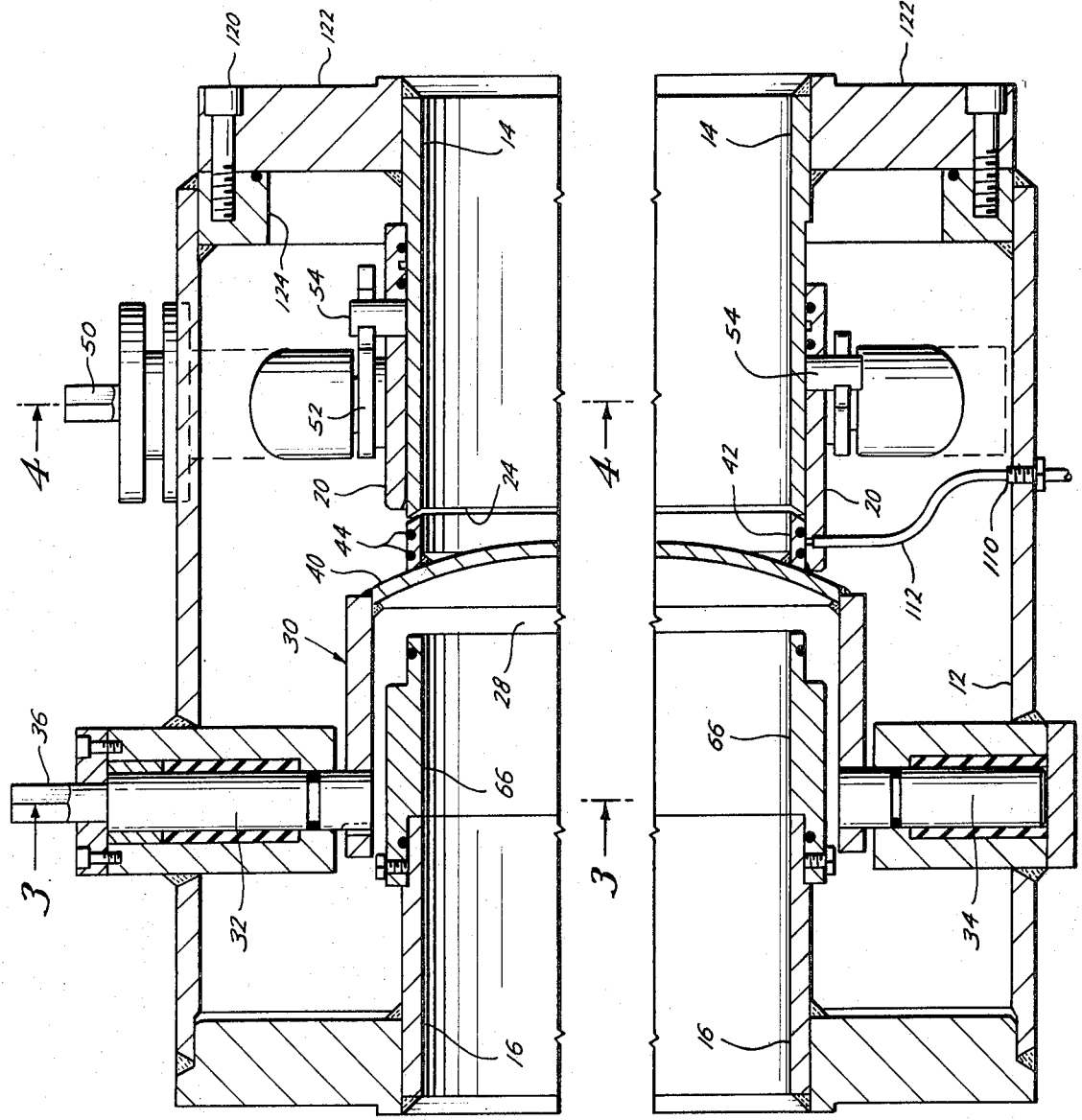
FIG. 2 is a cross-sectional view taken along the line 2—2 of FIG. 1, but showing the flow control means now rotated into position in the valve opening.
Figure 3:
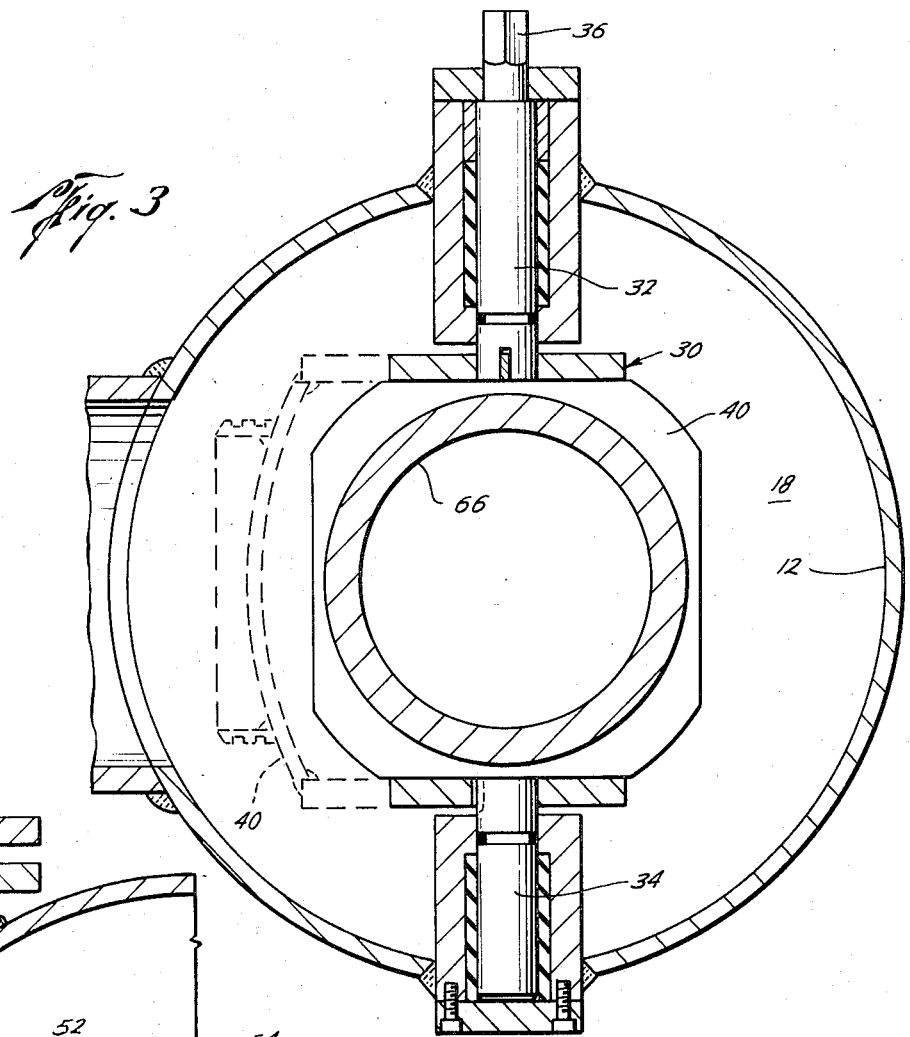
FIG. 3 is a cross-sectional view taken along the line 3—3 of FIG. 2.

Referring now to FIGS. 1, 2 and 2A, flow control means generally indicated by the reference numeral 30 is provided which may be rotated into the opening 28 for controlling the flow through the conduits 14 and 16, and rotated out of the opening 28 to permit the sleeve to cover the opening 28. In FIG. 1, the flow control means has been rotated approximately 90° out of the opening 28 thereby allowing the sleeve 20 to close the opening 28. The flow control means 30 may be pivotally mounted and supported from trunnions 32 and 34. The longitudinal axis of the trunnions 32 and 34 is preferably substantially perpendicular to the longitudinal axis of the conduits 14 and 16, here shown as vertical. One of the trunnions such as 32 may include a shaft 36 for connection to a suitable actuating means outside of the housing 12 such as a handle (not shown) for rotating the flow control means 30 into and out of the opening 28. The flow control means 30 is quick acting as it may be rotated into and out of the opening 28 with no more than a quarter of a turn of the shaft 36.

While the flow control means 30 may be various shapes such as flat, preferably the flow control means 30 includes a sector 40 of a hollow sphere or ball, which has the advantage of reducing the required width of the opening 29 to a minimum to allow rotation of the flow control means 30 into and out of the opening 28. Therefore the length of the body 12 of the valve may be kept at a minimum which becomes important in some applications. Furthermore, the flow control means when rotated out of the opening 28 is positioned in the housing 12 adjacent conduit 16 to provide a low profile valve as compared to a conventional gate valve. It is to be noted that the sector 40 is not required to contact or seal against end 26 of conduit 16 and therefore may be easily moved with a low torque.

In addition, the flow control means may optionally include a tubular member 42 correspondingly sized, contoured and positioned as to its periphery for engagement with the inside facing end of the sleeve 20 when the flow control means 30 is rotated into the opening 28 as best seen in FIGS. 2 and 2A. Preferably, the tubular member 42 has the same cross-section as the conduits 14 and 16 to provide a telescopic engagement with the sleeve 20. Seal means, such as O rings, may be provided on either the tubular member 42 or the sleeve 20 and preferably such as seals 44 positioned on the tubular member 42. As best seen in FIG. 1, an access opening 46 is provided connected to the body 12 and positioned so as to permit repair or replacement of the seating seals 44, as well as other repairs or adjustments, while the valve is in service by bleeding down the body cavity 18 through the bleed-off valve 48.

Figure 4:
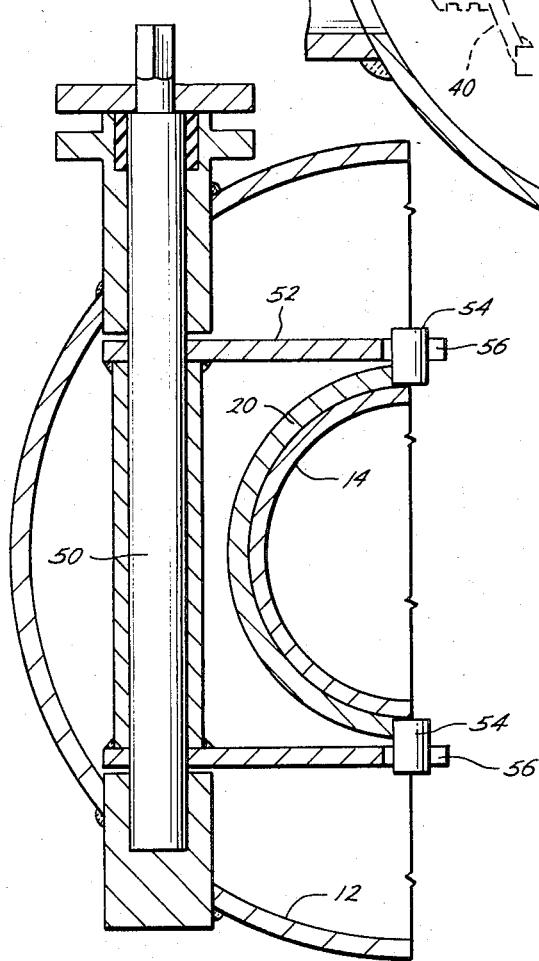
FIG. 4 is a cross-sectional view taken along the line 4—4 of FIG. 2.

The sleeve 20 may be telescopically moved relative to the conduits 16 and 14 to longitudinally move the sleeve 20 and open or close opening 28 by rotation of a shaft 50 and yoke assembly 52 (FIGS. 1, 2 and 4) to engage pins 54 connected to the sleeve 20 by slots 56 in the ends of the yoke assembly 52. Sleeve 20 is preferably sealed internally over the conduit 14 such as by O-ring seals 58. An auxiliary seal 60 may be provided by injecting a sealant through line 62 from a connector 64.

Preferably, the end 26 of the conduit 16 includes a removable seat extension 66. Seal means are provided between the sleeve 20 and the extension 66 such as by an O-ring seal 68 on the extension 66. The seal 68 may be repaired or replaced, when the valve is in service but in a shut-off position, through the access opening 46.

In order to repair or replace the seals 58, the sleeve 20 must be removed form the conduit 14. This requires the valve 10 to be out of service. By removing the seat extension 66, the width of the opening 28 is increased sufficiently in order that the sleeve 20 may also be removed from conduit 14 through the opening 20 and out of the valve 20 through access opening 46 to replace or repair the seals 58. This method of repair or replacement of seals 58 does not require the removal of valve 10 from the line. Or, if desired, studs 120 may be removed allowing valve end 122 and conduit 14 to be removed allowing O-ring seals 58 and 68 to be replaced as well as servicing other internal valve parts. However, this latter method of repair requires the valve 10 to be removed from the line.

Referring now to FIG. 2A, a fluid connection 110 may be made on the body 12 with a line 112 connected to the sleeve 20 so as to be positioned between the seals 44 on the tubular member 42 when the sleeve 20 telescopically engages the tubular member 42. Thus fluid connection may be vented to the exterior of the housing 12 to check the seals 44 for leakage.

As best seen in FIGS. 1–4, the flow control means 30 is shown as a type for shutting off flow through the valve 10. In FIG. 1, the valve 10 is shown in the open position with the sleeve 20 over the opening 28 and sealing against the ends 24 and 26 of the conduits 14 and 16. The flow control means 30 is rotated out of the opening 28. In order to close the valve 10, the shaft 50 is rotated, as best seen in FIG. 1A, to move the sleeve 20 back from the opening 28 into a retracted position leaving opening 28 clear to receive flow control means 30. Then shaft 32 is rotated, as best seen in FIG. 2, to rotate the flow control means 30 into the opening 28 to align the tubular member 42 with the end 24 of the conduit 14. The closing operation is completed, as best seen in FIG. 2A, by again rotating the shaft 50 to move the sleeve 20 into engagement with the tubular member 42 in which the sleeve 20 seals against the seals 44 to shut off flow between the conduits 14 and 16.

While the flow control means 30 shown in FIGS. 1–4 is shown as a single flow control element completely shutting off the flow between the conduits 14 and 16, the flow control means may perform other functions and may include a multiplicity of flow control units connected and moved together or operated individually. Referring now to FIG. 5, a flow control means generally indicated by the reference numeral 70 may include one or more valves such as check valves 72 and 74. Each of the valves 72 and 74 may be supported from a sector member 76 and 78, respectively, and each includes a tubular member 80 and 82, respectively, which function as the sector members and tubular member previously described. As shown in FIG. 5, with the check valve 72 in position in the opening 28 between the conduits 14 and 16, the check valves 72 will allow fluid passage from conduit 14 to conduit 16 but will check the flow in the opposite direction. If the flow control means 70 is rotated 90° to place the check valve 74 in position in the opening 28, fluid flow will pass from conduit 16 to conduit 14 but will be blocked from flow in the opposite direction. Therefore, using the flow control means 70, a double check valve is provided. Of course, the shut-off flow control means 30 of FIGS. 1–4 can be substituted for one of the check valves 72 or 74, if desired.

Referring now to FIG. 6, the flow control means may consist of a flow control means 30 such as shown in FIGS. 1–4 and, in addition, include a separately actuated flow control means 90, each of which may be provided to perform various functions. For example, the flow control means 30, when in engagement with sleeve 20, will close flow between the conduits 14 and 16. The flow control means 90, by way of example only, may include a removable orifice plate 92 for performing the function of assisting in measuring the fluid flow through the valve 10. Any suitable means may be used for separately actuating one or the other of the flow control means 30 or 90. Referring to FIG. 7, an upper trunnion shaft 94 is provided having a square cross-section area 96 for coacting with a square hole 98 in the flow control means 30 to provide the necessary rotation for rotating the flow control means 30 into and out of the opening 28 between the conduits 14 and 16. The rotative shaft 94 includes a circular cross-section 100 for coacting with a circular hole 102 on the flow control means 90 to provide an upper support for flow control means 90.

A second rotative shaft 104 is provided having a square cross-sectional area 106 coacting with a square hole 108 in the flow control means 90 for providing rotation to the flow control means 90 for moving it into and out of the opening 28. And the rotative shaft 104 includes a circular cross-sectional area 110 for coacting with a circular hole 112 in the flow control means 30 for providing support but no rotation to flow control means 30. Therefore, either one of the flow control means 30 or 90 may be moved into the opening 28 by actuation of the proper shaft 94 or 104. Of course, utilizing multiflow control means such as shown in FIGS. 5 and 6, it is desirable to provide access openings such as 46 in FIG. 1 on both sides of the valve 10 in order to service the flow control means. If the flow control means are connected together, such as shown in FIG. 5, the valve 10 will be a two-position valve, utilizing either position of the flow control means 70. However, by utilizing a separate actuation of the control means 30 and 90 of FIG. 6, the valve 10 may provide three differential functions. That is, the valve may be opened with the sleeve 20 in place over the opening 28 or either one of the flow control means 30 and 90 may be in position in the opening 28 to provide second and third operational functions for the valve.

Figure 8:
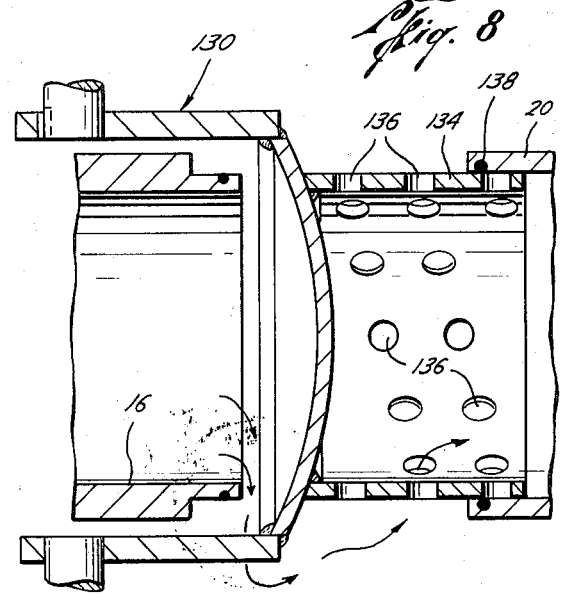
FIG. 8 is an elevational view, partly in cross-section illustrating a regulating type flow control means.

Referring now to FIG. 8, a flow control means generally indicated by the reference numeral 130 may include a regulating valve. The flow control means 130 may include a sector member 132 and a tubular member 134, which function as previously described. In addition, the tubular member 134 includes longitudinally extending opening means such as a plurality of holes 136, which are preferably helically positioned about the tubular member 134. A seal 138 is provided on the sleeve 20 whereby the amount of the area through which flow may pass can be varied by longitudinally positioning the sleeve 20. Therefore, the flow through the valve may be regulated or throttled as desired.

The present valve 10 therefore provides a through conduit valve, yet one which is quick acting by rotation of a flow control means. However, it is to be noted that contrary to the usual ball valve, the flow control means may be rotated with a minimum of torque and with a minimum of wear and tear on the seating seals 44.

The present invention, therefore, is well adapted to attain the ends and advantages mentioned as well as others inherent therein. While presently preferred embodiments of the invention are given for the purpose of disclosure, numerous changes in the detail of construction and arrangement of parts may be made which are within the spirit of the invention and the scope of the appended claims.

What is claimed is:

1. A valve comprising,
   a housing,
   a first conduit and a second conduit extending into the housing and being axially aligned with each other and each having one end positioned in the housing and longitudinally spaced from each other forming an opening therebetween,
   a sleeve within said housing slidably telescoping with said one end of the first and second conduits in a sealing relationship whereby when the sleeve covers the opening, flow is permitted through the conduit but is prevented from entering the housing,
   means for longitudinally moving the sleeve,
   flow control means pivotally supported for rotation into and out of said opening and including a tubular member contoured for engagement with the sleeve,
   means for rotating said flow control means into said opening, and
   seal means for providing a seal between the tubular member and the sleeve when the tubular member is rotated into the opening and engaged by the sleeve said tubular member being in telescoping engagement with said sleeve.

2. The apparatus of claim 1 wherein the control means is pivotally supported about an axis that is perpendicular to the longitudinal axis of said conduits.

3. The apparatus of claim 1 wherein at least one of said ends of the first and second conduit in the housing is removable thereby increasing the width of the opening for allowing internal removal of the sleeve for changing seals in the valve.

4. The apparatus of claim 1 wherein the flow control means comprises a sector of a hollow ball.

5. The apparatus of claim 1 wherein the flow control means is a flow barrier whereby when the control means is positioned in the opening, the end of the first conduit is closed.

6. The apparatus of claim 1 wherein the flow control means is a regulating valve comprising,
   longitudinally extending opening means in the tubular member, and said seal being on the sleeve whereby the amount of the opening means covered by the seal means may be varied by longitudinal movement of said sleeve.

7. The apparatus of claim 1 wherein the flow control means includes two flow control elements, either one of which may be rotated into said opening.

8. The apparatus of claim 7 wherein one of the control elements is a check valve in one direction and the second is a check valve in the second direction of the fluid flow.

9. The apparatus of claim 7 including means for rotating the two flow control elements separately.

10. The apparatus of claim 7 wherein the two flow control elements are connected together.

11. The apparatus of claim 9 wherein said rotating means includes,
    first and second trunnions extending into the housing and axially aligned, each of said trunnions supporting each of the flow control elements, the first of said trunnions connected to one of the flow control elements for rotating said one element, and the second of the trunnions connected to the other flow control element for rotating said other element.

12. The apparatus of claim 7 wherein one of the flow control means includes a removable orifice plate.

13. The apparatus of claim 7 wherein one of the flow control means includes a check valve.

14. A valve comprising,
a housing,
an inlet conduit and an outlet conduit extending into the housing and being axially aligned with each other and each having one end positioned in the housing and longitudinally spaced from each other forming an opening therebetween,
a sleeve within said housing slidably telescoping with said one end of the inlet and outlet conduits in a sealing relationship whereby when the sleeve covers the opening, flow is permitted through the conduits but is prevented from entering the housing,
means extending through the housing engaging the sleeve for longitudinally moving the sleeve relative to the said ends,
flow control means pivotally supported for rotation into and out of said opening, said means including an arcuate portion carrying a tubular member, said tubular member sized and contoured for telescopic engagement with the sleeve when the flow control means is rotated into the opening,
means for rotating said tubular member into said opening for engagement with the sleeve, and
seal means for providing a seal between the tubular member and the sleeve.

15. The apparatus of claim 14 wherein the seal means is on the tubular member and including,
an access opening in the housing for changing the tubular member.

16. The apparatus of claim 15 wherein one of the ends of the conduits in the housing is removable thereby increasing the width of the opening for allowing internal removal of the sleeve for changing seals in the valve.

17. The apparatus of claim 14 wherein the flow control means is a regulating valve comprising,
longitudinally extending opening means in the tubular member, and
said seal means being on the sleeve whereby the area of the opening means covered by the seal means may be varied by longitudinal movement of said sleeve.

* * * * *